United States Patent
Hartmann et al.

(10) Patent No.: US 8,905,877 B2
(45) Date of Patent: Dec. 9, 2014

(54) TENSIONING DEVICE WITH A CYLINDRICAL LATCHING SYSTEM

(75) Inventors: Christian Hartmann, Nemsdorf (DE); Petrus Hubertus Kroon, Fuerth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 411 days.

(21) Appl. No.: 13/239,886

(22) Filed: Sep. 22, 2011

(65) Prior Publication Data
US 2012/0108376 A1 May 3, 2012

(30) Foreign Application Priority Data

Oct. 28, 2010 (DE) .......................... 10 2010 049 900

(51) Int. Cl.
*F16H 7/08* (2006.01)
(52) U.S. Cl.
CPC ...... *F16H 7/0848* (2013.01); *F16H 2007/0806* (2013.01); *F16H 2007/0859* (2013.01); *F16H 2007/0817* (2013.01)
USPC .......................................................... 474/110
(58) Field of Classification Search
None
See application file for complete search history.

(56) References Cited

U.S. PATENT DOCUMENTS

| 7,331,891 | B2 * | 2/2008 | Poiret .......................... 474/110 |
| 7,458,909 | B2 * | 12/2008 | Hashimoto et al. ........... 474/110 |
| 2005/0014587 | A1 * | 1/2005 | Konishi et al. ................ 474/110 |
| 2010/0004080 | A1 * | 1/2010 | He ................................ 474/110 |

FOREIGN PATENT DOCUMENTS

EP          1 498 580 A2    1/2005

\* cited by examiner

*Primary Examiner* — William E Dondero
*Assistant Examiner* — Mark K Buse
(74) *Attorney, Agent, or Firm* — Davidson, Davidson & Kappel, LLC

(57) ABSTRACT

A tensioning device for an endless traction element in an engine. The tensioning device has a housing, a plunger, which can be moved in the housing, a compression spring arranged in the plunger, a nonreturn valve arranged between the plunger and the housing, a cylinder arranged in the plunger, and an engagement element. The plunger and the cylinder are connected to one another by a latching system via engagement of the engagement element, and the cylinder is connected materially to the nonreturn valve.

14 Claims, 1 Drawing Sheet

TENSIONING DEVICE WITH A CYLINDRICAL LATCHING SYSTEM

CROSS-REFERENCE TO RELATED APPLICATION

This application claims the priority of DE 10 2010 049 900.5 filed Oct. 28, 2010, which is incorporated by reference herein.

FIELD OF THE INVENTION

The invention relates to a tensioning device with a cylindrical latching system.

BACKGROUND OF THE INVENTION

In a power transmission mechanism configured to transmit the rotary motion of a crankshaft via an endless traction means, e.g. a chain, to one or more camshafts or other units of an internal combustion engine of a motor vehicle, the tension of the endless traction means is held constant by providing a tensioning device which exerts a tensioning force on the endless traction means. This tensioning force, which is transmitted to the endless traction means by a plunger of the tensioning device, can be provided by a cylindrical compression spring, for example. If there is a sag in the endless traction means, the plunger preloaded by the compression spring moves forwards in order to exert a pressure on the endless traction means, thus ensuring that the endless traction means once again rests with the necessary tension against the drive-input and drive-output pulleys of the crankshaft and of the camshafts or units and cannot slip.

The cylinder chamber of the tensioning device, in which the plunger is guided, can furthermore be supplied with a pressure medium, with the result that the tension of the endless traction means can be controlled by varying the tensioning force exerted by the plunger, and the retraction motion of the plunger is damped with the aid of a hydraulic oil fed in behind the plunger. The flow of hydraulic oil from an oil space situated in the housing to the plunger is generally regulated by a nonreturn valve.

In order to avoid slipping or skipping of teeth or driven gearwheels under shock loading, the tensioning device can have a latching system. The latching system is intended to prevent the plunger from being pushed too deep into the housing under shock loading, e.g. when the engine is started, resulting in a slackening of the tension on the endless traction means. One particular latching system is described in publication EP 1 498 580 B1, for example. This is a detent pawl latching system, in which a spirally toothed latching sleeve is provided within the plunger, into which latching sleeve an engagement element connected to the plunger engages. The toothing of the latching sleeve defines possible latching stages, as far as which the plunger can move back into the housing.

A cylindrical latching system of this kind requires a relatively large length of installation space, for which reason it is of only limited suitability for applications in which only a small amount of installation space is available. If the latching system is made smaller, it generally also has a reduced retraction stroke.

SUMMARY OF THE INVENTION

The invention relates to a tensioning device for an endless traction means in an engine with a cylindrical latching system for which the length of installation space is as small as possible.

Broadly, the tensioning device a housing, a plunger which can be moved in the housing, a compression spring arranged in the plunger, a nonreturn valve arranged between the plunger and the housing, a cylinder arranged in the plunger, and an engagement element. The plunger and the cylinder are connected to one another by way of a latching system by engagement of the engagement element, and the cylinder is connected materially to the nonreturn valve.

By virtue of the fact that the nonreturn valve and the cylinder are connected materially, fixed, in accordance with the invention, it is possible to dispense with previously required parts arranged in between and, overall, to reduce the necessary installation space. In particular, it is possible to omit the retention plate for securing the nonreturn valve cap. It is also possible to dispense with the cartridge which holds the compression spring in position. Another advantage of the tensioning device according to the invention is that there is no longer a need to compress the end of the cylinder associated with the nonreturn valve, thereby making it possible to achieve an increase in the quality and accuracy of production of the cylinder.

The cylinder and the nonreturn valve are preferably connected by a weld. Using a welded joint, the cylinder and the nonreturn valve are connected to one another particularly firmly and durably.

The cylinder and the nonreturn valve are preferably connected by a friction-welded joint. A friction weld is particularly well-suited to connecting the nonreturn valve and the cylinder in accordance with the invention, since this makes it possible to achieve a good-quality joint between the two components, even if they are composed of different materials. For example, aluminum can be friction-welded comparatively well even to steel, something that is completely impossible or possible to only a limited extent by other joining methods.

The cylinder and the nonreturn valve are preferably of integral design. In the case of a cylinder and nonreturn valve of integral design, both functions, the function of a latching system for the cylinder and the function of regulating oil for the nonreturn valve, are achieved in one component, thereby making it particularly simple to handle, e.g. to install or replace.

The compression spring is preferably supported directly on the nonreturn valve and exerts a retaining force on the nonreturn valve cap of the nonreturn valve. By means of this arrangement, the nonreturn valve cap of the nonreturn valve is held in position without the need for any other components. If rapid access to the interior of the nonreturn valve is necessary for certain reasons, this is made even easier by this arrangement according to the invention since it is also possible to remove the nonreturn valve cap easily by removing the spring, without having to undo any other components.

The cylinder is preferably pressed into the housing with the nonreturn valve. Pressing the unit comprising the nonreturn valve and the cylinder directly into the housing has the advantage that an involved process of machining for the purpose of preventing twisting of the plunger is no longer necessary. Unwanted twisting of the plunger can be avoided since the cylinder, which is connected to the plunger by the latching system, can no longer rotate about its center line since it is firmly connected to the nonreturn valve and, together with the nonreturn valve, firmly connected to the housing. It is thus also easier to carry out deliberate rotation of the plunger in order to adjust the latching stages since the cylinder cannot accidentally accompany this rotation.

The outside diameter of the cylinder and that of the nonreturn valve are preferably of the same size. If the outside diameters are of the same size, it is a particularly simple matter to press the components into the housing since only one bore, which preferably also has approximately the outside diameter thereof as the bore diameter, is necessary for them. Moreover, finish machining after friction welding, for example, in which residues of material are removed from the components by turning, can also be carried out in a particularly simple manner since the components can be turned to one size.

The housing is preferably composed substantially of aluminum. Tensioning devices in which the housing is composed of aluminum are particularly suitable for accommodating cylinders with a nonreturn valve that are connected in accordance with the invention, since it is a particularly simple matter to install the components in the housing and since, as components that are optimized in terms of weight and installation space, they can contribute to the intended lightweight construction of a tensioning device with an aluminum housing.

BRIEF DESCRIPTION OF THE DRAWINGS

The invention is explained in greater detail below with reference to a preferred illustrative embodiment. In the figures, the following are shown in particular.

DETAILED DESCRIPTION OF THE INVENTION

Figure 1:
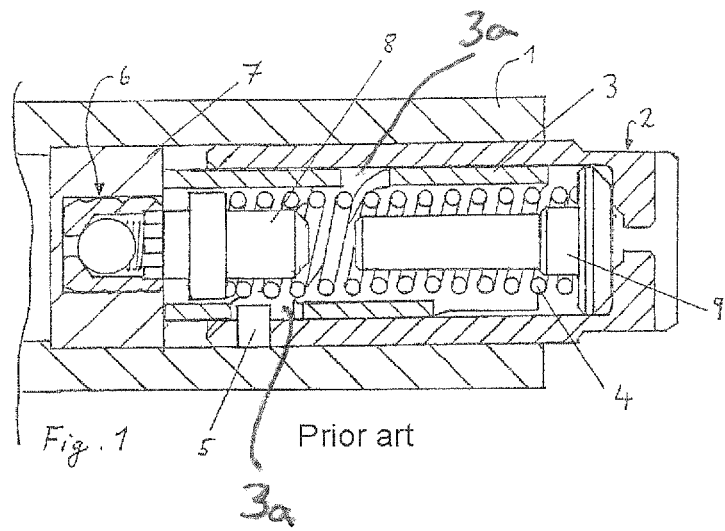
FIG. 1 illustrates a prior art tensioning device.

FIG. 1 illustrates a tensioning device of the kind described in publication EP 1 498 580 B1, for example. A plunger 2 is supported in a sliding manner in a housing 1 and is used to tension an endless traction means (not shown) in an engine. A cylinder 3, which here is embodied as a latching sleeve, is arranged within the plunger 2. The latching sleeve has spiral indent 3a, in which an engagement element 5 connected to the plunger 2 engages in a positive manner. Arranged within the latching sleeve is a compression spring 4, which rests at a first end against a cartridge 8 and, at a second end, against a vent plug 9. The vent plug 9 is associated with that side of the plunger 2 which projects from the housing 1 and enables air to escape from the interior of the plunger 2. The cartridge 8 rests against a nonreturn valve 6. To enable oil to flow out of an oil supply space (not shown), through the nonreturn valve 6, into the interior of the plunger 2, a passage, e.g. a duct, is provided within the cartridge. The nonreturn valve 6 is surrounded by a supporting element 7, which is fitted securely to the housing 1.

The spiral indent 3a of the latching sleeve enables it to be used to specify different latching stages that define how far the plunger 2 can be moved into the housing 1. The size of this adjustable retraction stroke depends inter alia on the available installation space that is available for the latching sleeve.

Figure 2:
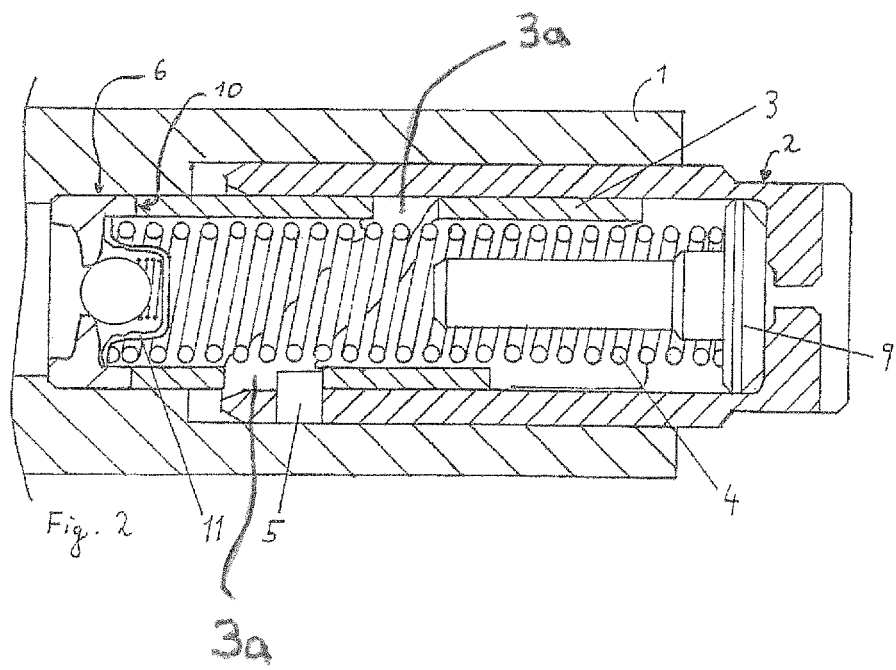
FIG. 2 illustrates a tensioning device according to the invention with a friction-welded joint between the cylinder and the nonreturn valve.

FIG. 2 illustrates a tensioning device according to the invention. The essential difference with respect to the prior art illustrated in FIG. 1 is that the cylinder 3, which here is embodied as a latching sleeve and is also referred to as such below, and the nonreturn valve 6 are connected by a friction-welded joint 10. This material connection between the components allows a more compact construction of the nonreturn valve 6 in comparison with the prior art and, moreover, the cartridge 8 (previously arranged between the spring 4 and the nonreturn valve 6) can be omitted. The spring 4 is now supported directly on the nonreturn valve 6 and simultaneously holds the nonreturn valve cap 11 firmly in position. Another advantage of the tensioning device according to the invention is that the end of the latching sleeve, associated with the nonreturn valve 6, no longer has to be compressed as before, thereby making it possible to achieve an increase in the quality and accuracy of production of the latching sleeve.

The friction-welded joint between the nonreturn valve 6 and the latching sleeve makes it possible for the nonreturn valve 6 and the latching sleeve to be joined, even when they are composed of different materials. Thus it is possible, for example, for a latching sleeve made of aluminum to be joined to a nonreturn valve 6 made of steel, something that is completely impossible or possible to only a limited extent by other joining methods.

The unit comprising the nonreturn valve 6 and the latching sleeve can be pressed directly into the housing 1, with the result that the plunger 2 no longer requires an involved process of machining to secure it against twisting. This is because the latching sleeve, which is connected to the plunger 2 by the latching system, can no longer rotate about its center line since it is now firmly connected to the nonreturn valve 6 or, together with the nonreturn valve 6, firmly connected to the housing 1. It is thus also easier to carry out deliberate rotation of the plunger 2 in order to adjust the latching stages, since the latching sleeve cannot accidentally accompany this rotation.

To weld the components, they are brought into contact at their end faces, for example, and are rotated relative to one another under a contact pressure until they heat up to such an extent at the contact surfaces that they weld together. The area around the joining zone is then finish machined, the components being turned to give a common outside diameter for example. The welded components can thus be pressed as a unit into an aluminum housing, for example, and can contribute through their comparatively low weight and installation volume to minimizing the weight of the tensioning device.

Another advantage of the tensioning device resulting from the welding together of the nonreturn valve 6 and the latching sleeve is that despite a reduction, in accordance with the invention, of the required installation space, the size of the adjustable retraction stroke remains the same and does not decrease with the reduction in size, as is otherwise conventional.

LIST OF REFERENCE SIGNS

1 Housing
2 Plunger
3 Cylinder
3a Spiral Indent
4 Compression Spring
5 Engagement Element
6 Nonreturn Valve
7 Supporting Element
8 Cartridge
9 Vent Plug
10 Friction-Welded Joint
11 Nonreturn Valve Cap

The invention claimed is:
1. A tensioning device for an endless traction means in an engine, comprising:
 a housing;
 a plunger which can be moved in the housing;
 a compression spring arranged in the plunger;
 a nonreturn valve arranged within the housing adjacent the plunger;

a cylinder arranged in the plunger and the cylinder having a first end materially connected to the nonreturn valve by a material connection; and an engagement element connected to the plunger and forming a latch system between the plunger and the cylinder, the nonreturn valve and the first end of the cylinder being arranged within a first cylindrical section of the housing having a first inside diameter, wherein the cylinder has an outside diameter and the nonreturn valve has an outside diameter and the outside diameter of the cylinder and the outside diameter of the nonreturn valve are of a same size as the first inside diameter.

2. The tensioning device according to claim 1, wherein the cylinder and the nonreturn valve are connected by a weld.

3. The tensioning device according to claim 2, wherein the cylinder and the nonreturn valve are connected by a friction-welded joint.

4. The tensioning device according to claim 1, wherein cylinder and the nonreturn valve are of integral design.

5. The tensioning device according to claim 1, wherein the nonreturn valve has a valve cap and the compression spring is supported directly on the nonreturn valve and exerts a retaining force on the valve cap of the nonreturn valve.

6. The tensioning device according to claim 1, wherein the housing is composed substantially of aluminum.

7. The tensioning device according to claim 1, wherein the housing comprises a second cylindrical section with a second inside diameter that is greater than the first inside diameter, a difference between the first inside diameter and the second inside diameter being equal to a wall thickness of the plunger.

8. A tensioning device for an endless traction means in an engine, comprising:

a housing;

a plunger which can be moved in the housing;

a compression spring arranged in the plunger;

a nonreturn valve arranged within the housing adjacent the plunger;

a cylinder arranged in the plunger and the cylinder having a first end materially connected to the nonreturn valve by a material connection; and an engagement element connected to the plunger and forming a latch system between the plunger and the cylinder, the nonreturn valve and the first end of the cylinder being arranged within a first cylindrical section of the housing having a first inside diameter, wherein the housing comprises a second cylindrical section with a second inside diameter that is greater than the first inside diameter, a difference between the first inside diameter and the second inside diameter being equal to a wall thickness of the plunger.

9. The tensioning device according to claim 8, wherein the cylinder and the nonreturn valve are connected by a weld.

10. The tensioning device according to claim 9, wherein the cylinder and the nonreturn valve are connected by a friction-welded joint.

11. The tensioning device according to claim 8, wherein cylinder and the nonreturn valve are of integral design.

12. The tensioning device according to claim 8, wherein the nonreturn valve has a valve cap and the compression spring is supported directly on the nonreturn valve and exerts a retaining force on the valve cap of the nonreturn valve.

13. The tensioning device according to claim 8, wherein the cylinder has an outside diameter and the nonreturn valve has an outside diameter and the outside diameter of the cylinder and the outside diameter of the nonreturn valve are of a same size as the first inside diameter.

14. The tensioning device according to claim 8, wherein the housing is composed substantially of aluminum.

\* \* \* \* \*